(12) United States Patent
Chen et al.

(10) Patent No.: US 10,311,067 B2
(45) Date of Patent: Jun. 4, 2019

(54) DEVICE AND METHOD FOR CLASSIFYING AND SEARCHING DATA

(71) Applicants: Inventec (Pudong) Technology Corporation, Shanghai (CN); INVENTEC CORPORATION, Taipei (TW)

(72) Inventors: Chih-Wei Chen, Taipei (TW); Hsiao-Fen Lu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 322 days.

(21) Appl. No.: 15/086,037

(22) Filed: Mar. 30, 2016

(65) Prior Publication Data

US 2017/0154046 A1  Jun. 1, 2017

(30) Foreign Application Priority Data

Nov. 27, 2015  (CN) .......................... 2015 1 0846742

(51) Int. Cl.
*G06F 17/30* (2006.01)
*G06F 16/2457* (2019.01)
*G06F 16/248* (2019.01)
*G06F 16/22* (2019.01)

(52) U.S. Cl.
CPC .... *G06F 16/24578* (2019.01); *G06F 16/2228* (2019.01); *G06F 16/248* (2019.01)

(58) Field of Classification Search
CPC ................................................. G06F 17/30705
See application file for complete search history.

(56) References Cited

U.S. PATENT DOCUMENTS

| | | | |
|---|---|---|---|
| 2004/0249794 A1* | 12/2004 | Nelson | G06Q 30/08 |
| 2013/0212089 A1* | 8/2013 | Lederer | G06F 17/30991 |
| | | | 707/723 |
| 2014/0129536 A1* | 5/2014 | Anand | G06Q 10/0635 |
| | | | 707/706 |

* cited by examiner

*Primary Examiner* — Hung Q Pham
(74) *Attorney, Agent, or Firm* — CKC & Partners Co., LLC

(57) ABSTRACT

A method for classifying and searching data includes marking classifications on a plurality of records according to data comprised by root cause fields or comment fields of the records; generating an index according to data comprised by synopsis fields of the records; marking weights on the records according to categories of data comprised by the synopsis fields of the records; utilizing the index for searching a plurality of corresponding records from the records according to a keyword; and selecting a plurality of related records from the corresponding records according to the weights of the corresponding records, and listing the classifications of the related records.

5 Claims, 4 Drawing Sheets

```
Open Date: 04/02/2012                    Submitter: Justin Chiang          Closed On: 04/05/2012 15:35:22
Last Change: 04/05/2012 15:35:22         Changed By: Colin Chiou            Days Open: 3
Customer/IssueNo:
    Synopsis: There are two devices with yellow mark in Windows Device Manager
Detail Description: [Re-produce steps]
                    1. Make sure system is in default BIOS setting and power on system.
                    2. Boot into Windows 2008 R2 and install latest SPP
                    3. Reboot system and check the device manager, there are two devices with yellow mark.
                    --Failed
Comments/Answer: 04/05/2012 10:14:16 Jim Chiou:>
                 Verified it with 323 ROM, it's PASSED
                 04/03/2012 14:48:06 Colin Chen:>
                 Please retest with 323 ROM
                 04/03/2012 12:24:37 Jim Chiou:>
                 Sometimes there is another yellow mark occurred on IPMI Compliant Device with 322 BIOS, please see attached screenshot "sometimes will have another yellow mark.png"
Root Cause:
```

DEVICE AND METHOD FOR CLASSIFYING AND SEARCHING DATA

RELATED APPLICATIONS

This application claims priority to Chinese Application Serial Number 201510846742.0, filed Nov. 27, 2015, which is herein incorporated by reference.

BACKGROUND

Field of Disclosure

The present disclosure relates to a device and a method for classifying and searching data. More particularly, the present disclosure relates to a device and a method for classifying and searching data of an error record.

Description of Related Art

In the field of electronic device testing, testing departments will record the errors generated during processes related to testing electronic devices in a database. When users want to inquire about an error, fields designed in the database can be utilized to inquire about the condition of an error, browse an error list or generate a report.

However, when users enter keywords for inquiring about an error, the system of the database performs a search according to a stored sequence to find error records corresponding to the entered keywords. Since an error record list of error records obtained in this manner is generated based simply on the storage sequence of error records in the database, the error records in the error record list are often not the error records the users are looking for.

In addition, the error records stored in the database are all described by words, and each user has his/her own word choice, resulting in different wording of error records stored in the database. Also as a result of this reason, the error records presented on the error record list are not the error records the users are looking for.

In view of the foregoing, problems and disadvantages are associated with existing products that require further improvement. However, those skilled in the art have yet to find a solution.

SUMMARY

The following presents a simplified summary of the disclosure in order to provide a basic understanding to the reader. This summary is not an extensive overview of the disclosure and it does not identify key/critical elements of the present disclosure or delineate the scope of the present disclosure.

One aspect of the present disclosure is directed to a device for classifying and searching data. The device comprises a memory and a processor. The memory is configured to store computer program codes processor is configured to execute the computer program codes in the memory for marking classifications on a plurality of records according to data comprised by root cause fields or comment fields of the records; generating an index according to data comprised by synopsis fields of the records; marking weights on the records according to categories of data comprised by the synopsis fields of the records; utilizing the index for searching a plurality of corresponding records from the records according to a keyword; and selecting a plurality of related records from the corresponding records according to the weights of the corresponding records, and listing the classifications of the related records.

Another aspect of the present disclosure is directed to a method for classifying and searching data. The method for classifying and searching data comprises marking classifications on a plurality of records according to data comprised by root cause fields or comment fields of the records; generating an index according to data comprised by synopsis fields of the records; marking weights on the records according to categories of data comprised by the synopsis fields of the records; utilizing the index for searching a plurality of corresponding records from the records according to a keyword; and selecting a plurality of related records from the corresponding records according to the weights of the corresponding records, and listing the classifications of the related records.

In view of the foregoing, embodiments of the present disclosure provide a device and a method for classifying and searching data to improve the problem of error records presented on an error record list usually not being the error records users are looking for because of the searching being based on a storage sequence in a database and a difference of word choice by users.

These and other features, aspects, and advantages of the present disclosure, as well as the technical means and embodiments employed by the present disclosure, will become better understood with reference to the following description in connection with the accompanying drawings and appended claims.

BRIEF DESCRIPTION OF THE DRAWINGS

The disclosure can be more fully understood by reading the following detailed description of the embodiment, with reference made to the accompanying drawings as follows:

FIG. 2 is a schematic diagram of an error record according to embodiments of the present disclosure;

Figure 1:
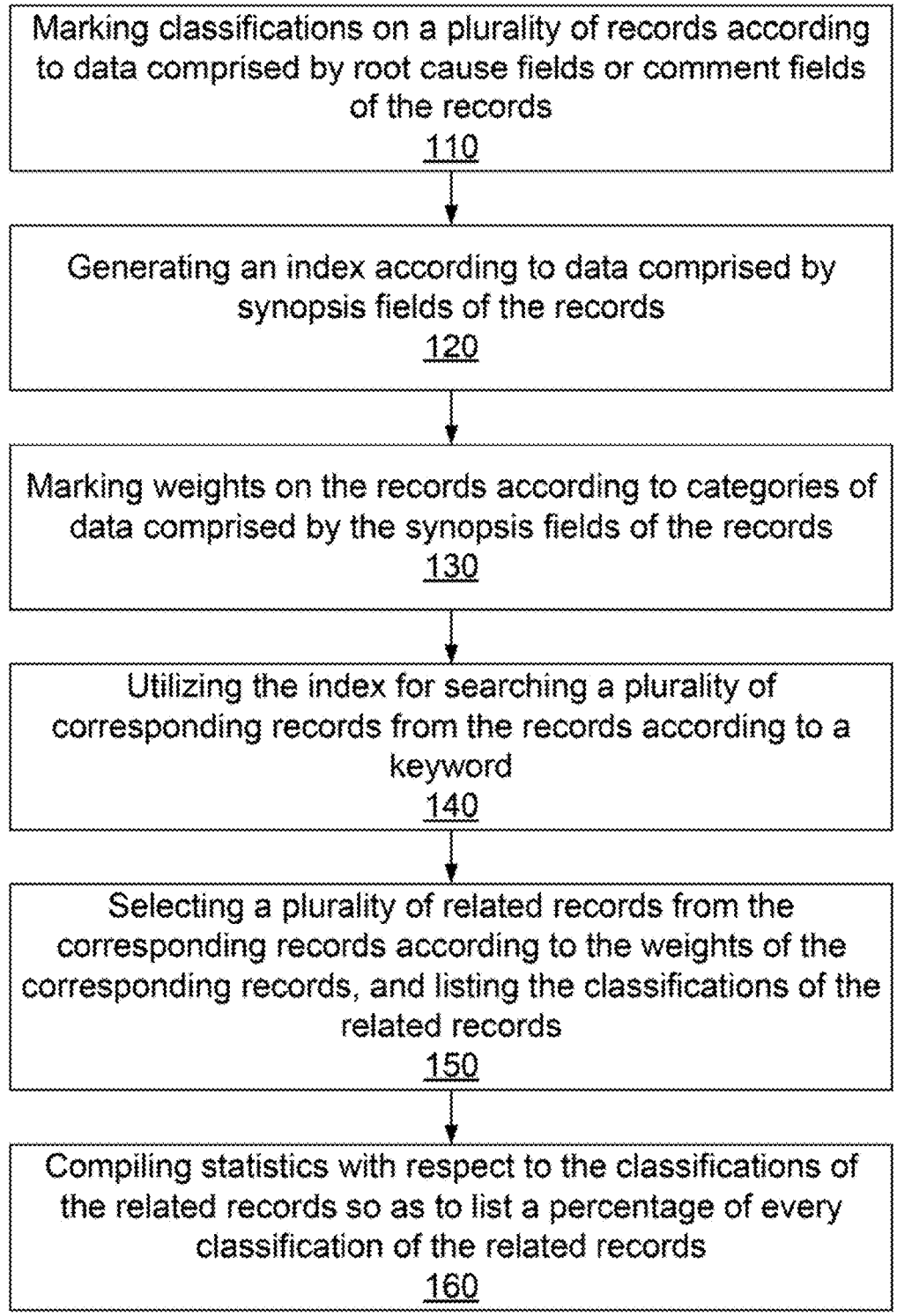
FIG. 1 is a flow diagram illustrating process steps of a method for classifying and searching data according to embodiments of the present disclosure.

In accordance with common practice, the various described features/elements are not drawn to scale but instead are drawn to best illustrate specific features/elements relevant to the present disclosure. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include singular forms of the same.

For solving the problem of error records presented on an error record list usually not being the error records a user is looking for when the user enters a keyword for inquiring about an error, the present disclosure provides a device and a method for classifying and searching data. The device and the method can completely classify error records generated from previous testing processes, and provide an index that allows a user to efficiently search the error records the user is looking for. In addition, the device and the method can further provide corresponding weights to error records. Therefore, an error list including error records a user is looking for can be arranged based on the foregoing weights such that the user may find the error records the user is looking for efficiently, which will be described in detail below.

The device for classifying and searching data comprises a memory and a processor. The memory is configured to store computer program codes. The processor is configured to execute the computer program codes in the memory for performing steps of a method as shown in FIG. 1 which is a flow diagram illustrating process steps of the method for classifying and searching data according to embodiments of the present disclosure. In FIG. 1, the method 100 for classifying and searching data comprises steps as shown below Step 110: marking classifications on a plurality of records according to data comprised by root cause fields or comment fields of the records;

Step 120: generating an index according to data comprised by synopsis fields of the records;

Step 130: marking weights on the records according to categories of data comprised by the synopsis fields of the records;

Step 140: utilizing the index for searching a plurality of corresponding records from the records according to a keyword;

Step 150: selecting a plurality of related records from the corresponding records according to the weights of the corresponding records, and listing the classifications of the related records; and Step 160: compiling statistics with respect to the classifications of the related records so as to list a percentage of every classification of the related records.

For facilitating understanding of operations related to step 110, reference is now made to both. FIG. 1 and FIG. 2. FIG. 2 is a schematic diagram of an error record according to embodiments of the present disclosure. The error record 210 is a record list that stores errors generated during processes related to testing electronic devices by testing departments. The error record 210 comprises a plurality of fields for recording a variety of details of error conditions, for example, a synopsis field (Synopsis), a detail operation field (Detail Description), a comment field (Comments/Answer), a root cause field (Root Cause), and so on. The method 100 for classifying and searching data of the present disclosure classifies all error records generated from previous testing processes according to data stored in fields of the error record 210.

Referring to step 110, the method of the present disclosure can mark classifications on the records according to data stored in root cause fields or comment fields of the records. For example, the method of the present disclosure can determine whether the root cause field of each of the records stores data. If the root cause field stores data, a corresponding classification is received from a conversion table according to the data, and the corresponding classification will be marked on the record. For instance, if the root cause field stores BIOS (Basic Input/Output System), ROM (Read-Only Memory), ACPI (Advanced Configuration and Power Interface), SMBIOS (System Management BIOS), and so on, the data is classified as a BIOS Error according to the conversion table. In addition, if the root cause field stores iLO (Integrated Lights-out), Server Mgmt (Sever Management), BMC (Baseboard Management Controller), and so an, the data is classified as a Mgmt Firmware error according to the conversion table. Subsequently, the classification will be marked on the error record.

On the other hand, if the root cause field does not store data, a corresponding classification is received from the conversion table according to the data stored in the comment field, and the corresponding classification will be marked on the record. For example, the method of the present disclosure can involve compiling statistics with respect to a plurality of comments stored in the comment field so as to receive a related comment having the highest number of the comments. For instance, if a ROM comment occurs in the comment field frequently, ROM is regarded as the related comment. The method of the present disclosure receives a corresponding classification BIOS error from the conversion table according to the related comment ROM and marks the classification BIOS error on the error record.

In addition, if the related comment cannot be received from the comment field (for example, the comment field comprises too many comments) and the number of each kind of comment is similar (for example, the comment field comprises ROM, BIOS, ACPI, Server Mgmt, BMC, and the occurrence of each of ROM, BIOS, ACPI, Server Mgmt, BMC is three), the error record will be marked as unknown; meanwhile, a warning will be generated. When users receive the warning, users can take appropriate measures to improve such an error record. For example, if there are too many comments of the error, this indicates that there are many reasons which will cause electronic device malfunction. At this time, every testing department can get together to discuss and solve the error.

Referring to step 120, the method of the present disclosure can generate an index according to data comprised by synopsis fields of the error records. For example, the method of the present disclosure can utilize an index tool to gather keywords stored in the synopsis fields of all error records and make an index, such that when users enter keywords for inquiring about an error, the index can be used to reverse lookup the keywords to know in which synopsis field of the error records the keywords have ever been stored.

Referring to step 130, the method of the present disclosure can be used to mark weights on the error records according to categories of data comprised by the synopsis fields of the error records. For example, the method of the present disclosure can utilize big data processing to preprocess keywords stored in the synopsis field of the error record. An analyzing process is performed based on all keywords in the synopsis field for deleting words which are not related to errors (for example, a, an, the, when, system, and so on), and mark categories on the keywords in the synopsis fields. Subsequently, a corresponding weight is received and marked on the error records according to the categories of the keywords in the synopsis field. When users enter a keyword for inquiring about an error, the synopsis field the users want to inquire about can be compared with the synopsis field of the error record for finding the most similar error record. In another embodiment, TF-IDF (term frequency-inverse document frequency) can be utilized to analyze all keywords in the synopsis field of the error record and receive a weight of each of the keywords so as to mark a corresponding weight on the error record.

In general, data in the synopsis field are used to describe an element under test, a testing action, an error phenomenon, and so on. Therefore, the method of the present disclosure can analyze keywords in the synopsis fields to categorize the error records into an element under test category, a testing action category or an error phenomenon category. For example, CPU, Memory, Windows, Linux, VMWare in the synopsis field can be categorized into the element under test category. The Stress, install, test, diag in the synopsis field can be categorized into the testing action category. The power cycle, hang, blue screen, reboot, yellow bang in the synopsis field can be categorized into the error phenomenon category.

Furthermore, the method of the present disclosure can code the element under test category, the testing action category, and the error phenomenon category. For example, keywords in the synopsis field can be coded using a single bit. As shown above, the element under test category has five kinds of elements, the testing action category has four kinds of actions, and the error phenomenon category has five kinds of error phenomena. Therefore, keywords of the synopsis field of each error record can be coded by fourteen bits, for example, it can be coded as "00100: 1000: 01100." In addition, the method of the present disclosure can mark the code on the error records according to the categories of data stored in the synopsis fields.

Moreover, since keywords in the synopsis field can be coded by fourteen bits, a fourteen dimension space vector is therefore formed. The method of the present disclosure can calculate a first vector according to the code of the error records and mark the first vector on the error records according to the categories of keyword stored in the synopsis fields. Additionally, the method of the present disclosure can analyze keywords entered by users to categorize the keyword into the element under test category, the testing action category or the error phenomenon category and mark the code on the keyword according to the category of the keyword. Secondly, a second vector is calculated according to the code of the keyword. Subsequently, a vector distance of the first vector of the error record and the second vector of the keyword is calculated. Next, the related records are selected according to the vector distance, and the classifications of the related records are listed. It is noted that if the distance of the vector distance is small, this indicates that two vectors related to the vector distance is similar to each other. Hence, the foregoing procedure can be used to find the most similar error record.

In another embodiment, a cosine similarity can be used to determine a similarity of the first vector of the error record and the second vector of the keywords. For example, if the first vector is [x1,y1] and the second vector is [x2,y2], the calculation formula of the cosine similarity is as shown below:

$$\cos\theta = \frac{x1x2 + y1y2}{\sqrt{x1^2 + y1^2} \times \sqrt{x2^2 + y2^2}} \quad \text{formula 1}$$

In addition, the cosine similarity may be appropriately used in relation to n-dimensional vectors. For example, if each of the first vector and the second vector is an n-dimensional vector, the first vector is [A1,A2, ..., An], and the second vector is [B1, B2, ..., Bn], the calculation formula of the cosine similarity is as shown below:

$$\cos\theta = \frac{\sum_{i=1}^{n} Ai \times Bi}{\sqrt{\sum_{i=1}^{n} (Ai^2)} \times \sqrt{\sum_{i=1}^{n} (Bi^2)}} \quad \text{formula 2}$$

It is noted that, in formulas 1 and 2, if the calculated value of cosine is near 1, this indicates that the angle between two vectors is near zero degrees. That is to say, the similarity of the two vectors is high. As mentioned above, keywords in the synopsis field can be coded by fourteen bits to form a fourteen dimension space vector; and therefore, the first vector of the error record and the second vector of the keyword can use formula 2 to calculate and obtain a vector distance. The similarity of the two vectors can be known from the value of cosine. Subsequently, related error records can be selected according to the similarity, and the classifications of the related error records can be listed. Therefore, the foregoing procedure can be used to find the most similar error record.

Referring to step 140, when users enter keywords for inquiring about an error, the method of the present disclosure can utilize the index generated in step 120 for searching a plurality of corresponding records from the records according to the keyword. In other words, an error record which is corresponding to the keyword can be found from all error records.

Figure 3:
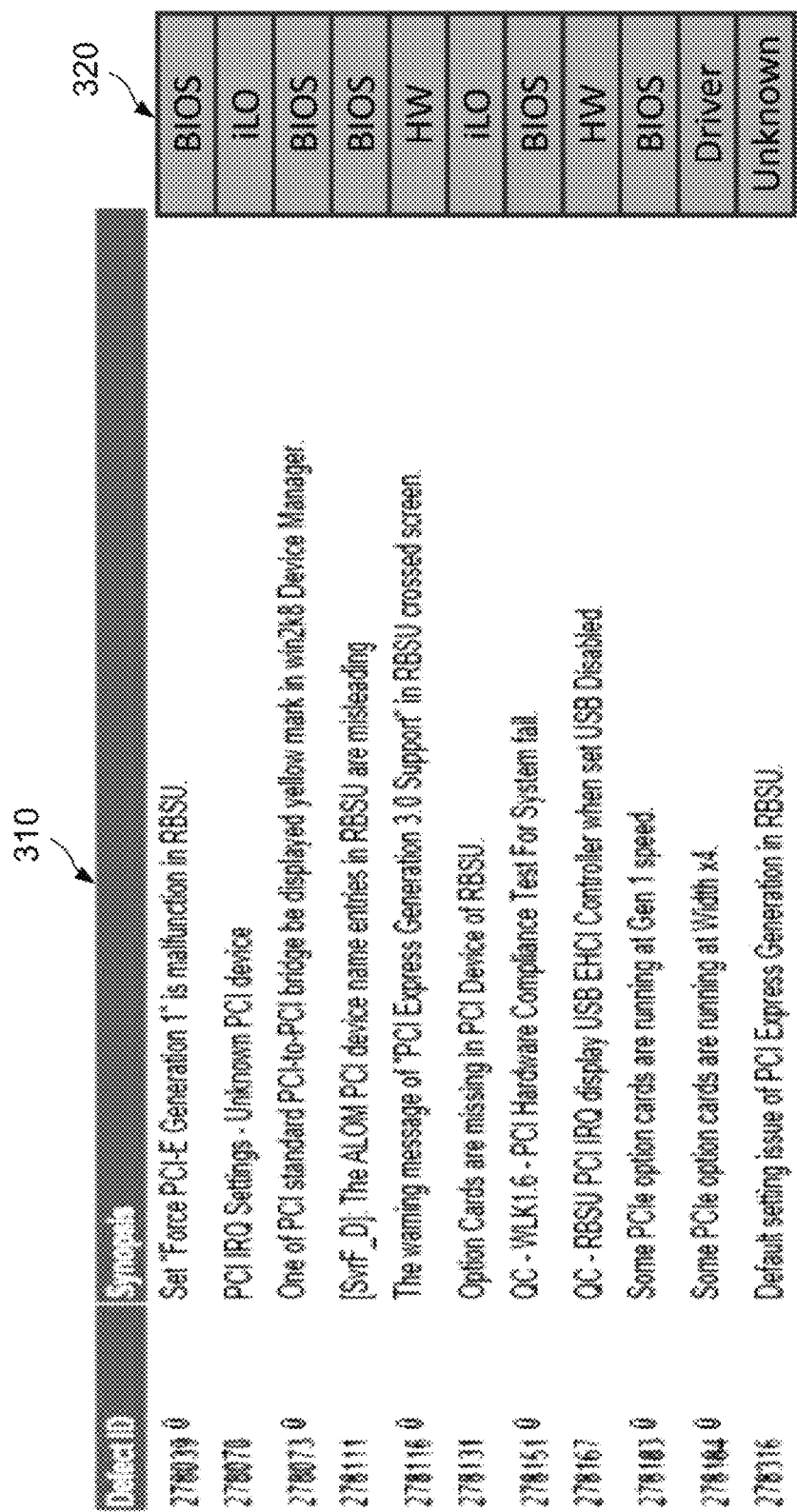
FIG. 3 is a schematic diagram of a list of error records and error-classified marks according to embodiments of the present disclosure.

For facilitating understanding of the operations of step 150, reference is now made to both FIG. 1 and FIG. 3. FIG. 3 is a schematic diagram of a list of error records and error-classified marks according to embodiments of the present disclosure. In step 150, the method of the present disclosure can select a plurality of related records from the corresponding records according to the weights of the corresponding records, and list the classifications of the related records. It is noted that there may be a large number of the error records which correspond to the keywords. Therefore, the method of the present disclosure can sift the error records according to the weights for selecting the most nearest related record. For example, the most nearest 100 related records are sifted from 1000 corresponding error records.

As shown in FIG. 3, the error record list 310 record's a plurality of related error records searched in step 150. In addition, the method of the present disclosure can list the classification 320 of the related error records. For example, the classification 320 of the error record labeled as 278039 in the error record list 310 is BIOS, the classification 320 of the error record labeled as 278070 in the error record list 310 is iLO, and the classification 320 of the rest of the error records in the error record list 310 can be listed in a similar manner. Since the method of the present disclosure can provide corresponding weights to the error records, the error records in the error record list 310 can be arranged based on the weight. As a result, users can find the error record they are looking for, and moreover, can take note of the classification 320 of the error records, such that users can correct the errors efficiently.

Figure 4:
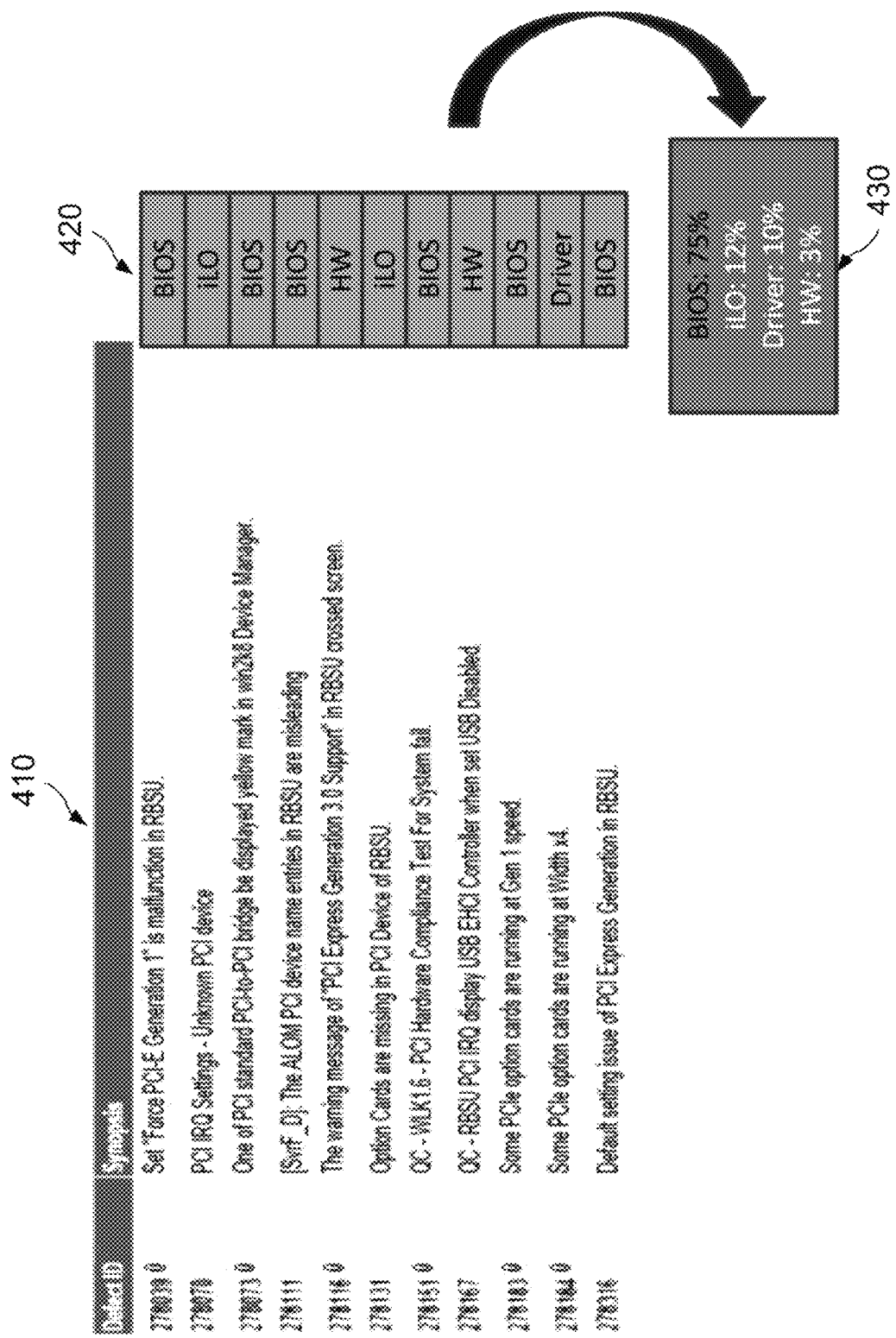
FIG. 4 is a schematic diagram of a list of error records and error-classified percentage of error records according to embodiments of the present disclosure.

For facilitating understanding of operations of step 160, reference is now made to both FIG. 1 and FIG. 4. FIG. 4 is a schematic diagram of a list of error record's and error-classified percentage of error records according to embodiments of the present disclosure. The error record list 410 and the classification 420 in FIG. 4 are similar to the error record list 310 and the classification 320 in FIG. 3. Referring to step 160, the method of the present disclosure can compile statistics with respect to a plurality of related records for listing a percentage of every classification 420 of the related records in FIG. 4. Referring to the error-classified percentage list 430 of FIG. 4, the percentage of BIOS is 75%, the percentage of iLo is 12%, the percentage of Driver is 10%, and the percentage of HW is 3%. As shown in the percentage ranking, the percentage of BIOS is the highest. Therefore, the reason with the highest possibility to have caused such an error is BIOS. Hence, users may take note of the reason with the highest possibility to have caused the error according to the error-classified percentage list 430, such that users can correct the errors efficiently.

The above-described method for classifying and searching data can be implemented by software, hardware, and/or firmware. For example, if an implementer determines that speed and accuracy are paramount, the implementer may opt for a mainly hardware and/or firmware implementation; if flexibility is paramount, the implementer may opt for a mainly software implementation; alternatively, the collaboration of software, hardware and firmware may be adopted. It should be noted that none of the above-mentioned examples is inherently superior to the other and shall be considered limiting to the scope of the present disclosure; rather, these examples can be utilized depending upon the context in which the unit/component will be deployed and the specific concerns of the implementer.

Further, as may be appreciated by persons having ordinary skill in the art, the steps of the method for classifying and searching data are named according to the function they perform, and such naming is provided to facilitate the understanding of the present disclosure but not to limit the steps. Combining the steps into a single step or dividing any one of the steps into multiple steps, or switching any step so as to be a part of another step falls within the scope of the embodiments of the present disclosure.

In view of the above embodiments of the present disclosure, it is apparent that the application of the present disclosure has a number of advantages. Embodiments of the present disclosure provide a device and a method for classifying and searching data to improve the problems of error records presented on an error record list usually not being the error records users are looking for because of the searching being based on a storage sequence in a database and a difference of word choice by users.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A device for classifying and searching data, comprising:
a memory configured to store computer program codes;
a processor configured to execute the computer program codes in the memory for:
marking classifications on a plurality of records according to data comprised by root cause fields or comment fields of the plurality of records;
generating an index according to data comprised by synopsis fields of the plurality of records;
marking weights on the plurality of records according to categories of data comprised by the synopsis fields of the plurality of records, wherein the processor is further configured to execute the computer program codes in the memory for:
marking categories on data comprised by the synopsis fields, wherein the processor is further configured to execute the computer program codes in the memory for:
analyzing data comprised by the synopsis fields to categorize the plurality of records into an element under test category, a testing action category or an error phenomenon category;
receiving and marking corresponding weights on the plurality of records according to categories of data comprised by the synopsis fields, wherein the processor is further configured to execute the computer program codes in the memory for:
coding the element under test category, the testing action category, and the error phenomenon category;
marking a code on the plurality of records according to categories of data comprised by the synopsis fields, wherein the processor is further configured to execute the computer program codes in the memory for:
calculating a first vector according to the code on the plurality of records; and
marking the first vector on the plurality of records according to categories of data comprised by the synopsis fields;
utilizing the index for searching a plurality of corresponding records from the plurality of records according to a keyword;
analyzing the keyword to categorize the keyword into the element under test category, the testing action category or the error phenomenon category;
marking a code on the keyword according to categories of the keyword;
calculating a second vector according to the code on the keyword;
calculating a vector distance of the first vector and the second vector; and
selecting a plurality of related records from the plurality of corresponding records according to the vector distance, and listing classifications of the plurality of related records.

2. The device of claim 1, wherein the processor is further configured to execute the computer program codes in the memory for:
compiling statistics with respect to the classifications of the plurality of related records so as to list a percentage of every classification of the plurality of related records.

3. The device for classifying and searching data of claim 1, wherein the processor is further configured to execute the computer program codes in the memory for:
determining whether the root cause field of each of the plurality of records comprises a first data;
if the root cause field comprises the first data, receiving a first corresponding classification from a conversion table according to the first data and marking the first corresponding classification on the record;

if the root cause field does not comprise the first data, receiving a second corresponding classification from the conversion table according to a second data comprised by the comment field and marking the second corresponding classification on the record.

4. The device of claim 3, wherein the processor is further configured to execute the computer program codes in the memory for:

compiling statistics with respect to a plurality of comments comprised by the second data so as to receive a related comment having the highest number of the comments; and receiving the second corresponding classification from the conversion table according to the related comment and marking the second corresponding classification on the record.

5. The device of claim 4, wherein the processor is further configured to execute the computer program codes in the memory for:

if the related comment having the highest number of the comments is not received, marking unknown on the record and generating a warning.

* * * * *